US010425963B2

(12) United States Patent
Ratasuk et al.

(10) Patent No.: US 10,425,963 B2
(45) Date of Patent: *Sep. 24, 2019

(54) COMMUNICATING INFORMATION INDICATING SUPPORT FOR A PLURALITY OF COVERAGE ENHANCEMENT LEVELS

(71) Applicant: Nokia Solutions and Networks Oy, Espoo (FI)

(72) Inventors: Rapeepat Ratasuk, Hoffman Estates, IL (US); Weidong Yang, San Diego, CA (US); Jun Tan, Lake Zurich, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 16/037,107

(22) Filed: Jul. 17, 2018

(65) Prior Publication Data

US 2019/0141739 A1  May 9, 2019

Related U.S. Application Data

(63) Continuation of application No. 14/909,489, filed as application No. PCT/EP2014/066351 on Jul. 30, 2014, now Pat. No. 10,057,923.

(60) Provisional application No. 61/864,265, filed on Aug. 9, 2013.

(51) Int. Cl.
*H04W 74/00* (2009.01)
*H04W 4/70* (2018.01)
*H04L 12/26* (2006.01)
*H04W 24/02* (2009.01)

(52) U.S. Cl.
CPC ....... *H04W 74/004* (2013.01); *H04L 43/0829* (2013.01); *H04L 43/16* (2013.01); *H04W 4/70* (2018.02); *H04W 24/02* (2013.01)

(58) Field of Classification Search
CPC ..... H04W 74/004; H04W 4/70; H04W 24/02; H04L 43/0829; H04L 43/16
See application file for complete search history.

(56) References Cited

U.S. PATENT DOCUMENTS

| 10,057,923 B2* | 8/2018 | Ratasuk | H04W 4/70 |
|---|---|---|---|
| 2011/0294499 A1 | 12/2011 | Vikberg | 455/423 |
| 2012/0115532 A1 | 5/2012 | He | 455/522 |

(Continued)

OTHER PUBLICATIONS

3GPP TS 36.331 V8.17.0 (Jun. 2012), "$3^{rd}$ Generation Partnership Project; Technical Specification Group Radio Access Network; Evolved Universal Terrestrial Radio Access (E-UTRA); Radio Resource Control (RRC); Protocol specification (Release 8)", 215 pgs.

(Continued)

*Primary Examiner* — Omar J Ghowrwal
(74) *Attorney, Agent, or Firm* — Harrington & Smith

(57) ABSTRACT

Various communication systems may benefit from identification of and communication of coverage shortfall. For example, certain communication systems that employ machine type communication devices may benefit from having such shortfall communicated from the devices to a base nation. For example, a method can include determining an amount of coverage shortfall of a device. The method can also include transmitting an indication of the amount of coverage shortfall.

20 Claims, 5 Drawing Sheets

(56) References Cited

U.S. PATENT DOCUMENTS

| | | | |
|---|---|---|---|
| 2013/0170428 A1 | 7/2013 | Morioka | 370/315 |
| 2014/0169325 A1 | 6/2014 | Ratasuk | 370/330 |
| 2015/0109910 A1 | 4/2015 | Hurd | 370/230 |
| 2015/0312876 A1 | 10/2015 | Syrjarinne | 455/456.1 |
| 2016/0174083 A1 | 6/2016 | Viorel | 370/252 |
| 2017/0105127 A1 | 4/2017 | Xiong | |

OTHER PUBLICATIONS

3GPP TSG RAN WG1 Meeting #72 bis, Chicago, USA, Apr. 15-19, 2013, R1-130887, "Analysis and evaluation of PRACH coverage improvement for Low-Cost MTC UEs", Huawei, HiSilicon, 6 pgs.

3GPP TSG RAN WG1 Meeting #72bis, Chicago, USA, Apr. 15-19, 2013, R1-131054, "Coverage Improvement Analysis of PRACH for TR36.888 and text proposal", ZTE, 7 pgs.

3GPP TSG RAN WG1 Meeting #72bis, Chicago, USA, Apr. 15-19, 2013, R1-131820, "Test proposal for PRACH coverage improvement for MTC", Huawei, HiSilicon, 2 pgs.

3GPP TSG RAN WG1 Meeting #73, Fukuoka, Japan, May 20-24, 2013, R1-132410, "Considerations on acquiring the amount of coverage improvement for Low-Cost MTC UEs", Huawei, HiSilicon, 2 pgs.

3GPP TSG RAN1#74, Barcelona, Spain, Aug. 19-23, 2013. R1-133482, "Mechanism for Identifying and Communicating Coverage Shortfall Discussion and Decision", NSN, Nokia, 3 pgs.

3GPP TSG RAN meeting #60, Oranjestad, Aruba, Jun. 10-14, 2013, RP-130848, "New WI: low cost & enhanced coverage MTC UE for LTE", Vodafone, 17 pgs.

\* cited by examiner

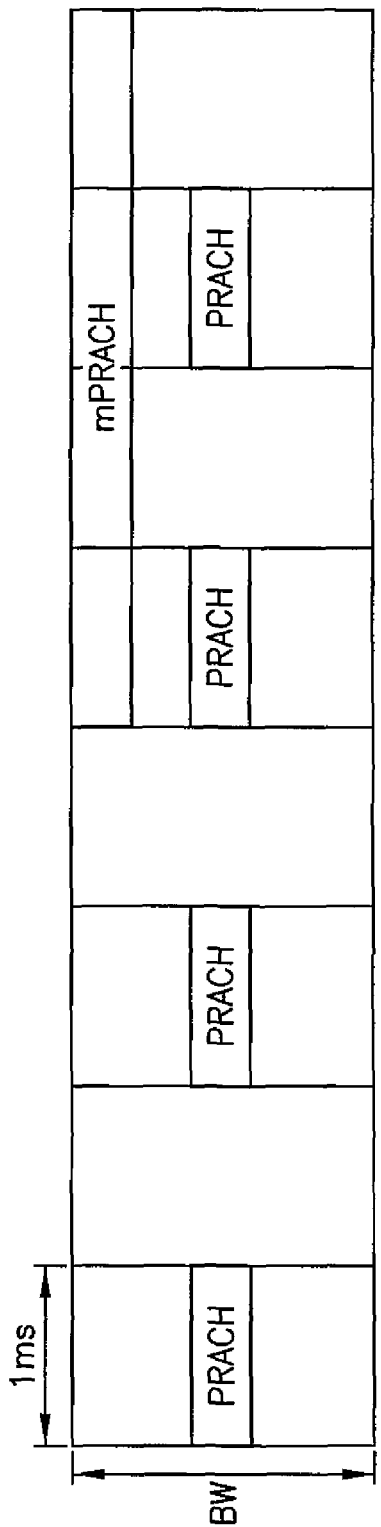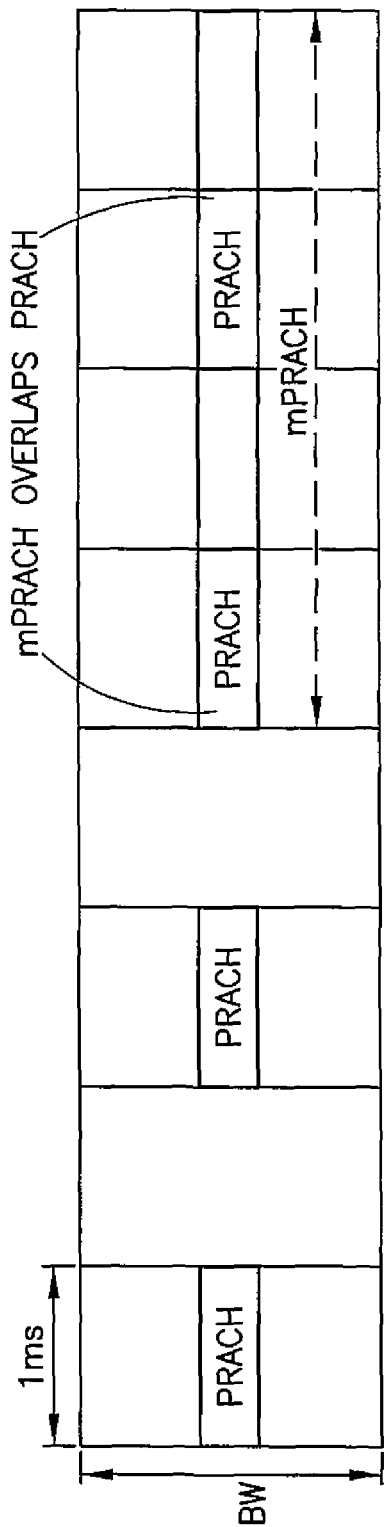

COMMUNICATING INFORMATION INDICATING SUPPORT FOR A PLURALITY OF COVERAGE ENHANCEMENT LEVELS

CROSS-REFERENCE TO RELATED APPLICATIONS

This patent application is a continuation of and claims priority to U.S. patent application Ser. No. 14/909,489 filed Feb. 2, 2016, which claims priority to PCT Patent Application Serial No. PCT/EP2014/066351 filed Jul. 30, 2014, which claims priority to U.S. Provisional Patent Application No. 61/864,265, filed Aug. 9, 2013, the entirety of which is hereby incorporated herein by reference.

BACKGROUND

Field

Various communication systems may benefit from identification of and communication of coverage shortfall. For example, certain communication systems that employ machine type communication devices may benefit from having such shortfall communicated from the devices to a base station.

Description of the Related Art

In long term evolution (LTE) release 12 (Rel-12) coverage improvement for Machine Type Communications (MTC) may aim to extend LTE coverage 15 dB beyond the typical range of LTE, defined by the LTE study item as cell-edge data rate of 20 kbps. Such an extension may allow LTE to be used for services such as smart metering, where the meters may be installed in basements or shielded locations and therefore subject to substantial penetration loss.

Conventionally, however, there is no appropriate mechanism(s) to support scalability of spectral efficiency impact for coverage improvement by identifying user equipment (UE) requiring additional coverage improvement and informing eNB the amount of coverage the UE requires. Although the term user equipment is used herein, it should be broadly understood to include all kinds of terminal devices including devices such as smart meters and sensors, which may not have conventional users.

FIG. 1 illustrates the RRC connection setup message sequence prior to establishment of service. In general, the sooner the eNB is informed of the UE coverage shortfall, the better. Otherwise, all messages prior to acquiring this information may have to be transmitted with the maximum amount of redundancy or repetition. From FIG. 1, it can be seen that this information can be communicated by the UE using the random access preamble, radio resource control (RRC) connection request message, or RRC connection setup complete message.

User equipment (UEs) in coverage limited situations may transmit using the maximum power, for example, based on downlink (DL) path loss or after power ramping. Thus, it can be hard for the eNB to accurately determine the amount of coverage shortfall from uplink (UL) signal to interference plus noise ratio (SINR) estimation. Instead, the UE is best to determine this amount with respect to nominal cell coverage.

According to certain approaches, coverage shortfall may be transmitted on the physical random access channel (PRACH). This could be done, for example, via preamble selection or having a specific PRACH tied to a coverage shortfall amount. Using the PRACH to send additional information can substantially reduce the PRACH capacity. If the capacity of the PRACH is reduced, then more random access opportunities have to be configured, leading to increased overhead. Furthermore, even if the PRACH can be used, it can only convey a limited amount of information and may not be very efficient at doing so. For example, only a few bits may be possible and there may be neither coding nor cyclic redundancy check (CRC) protection, so the information may be unreliable.

According to one approach, different PRACH configurations can be chosen by UEs based on the estimated path loss according to some predefined or broadcasted rule. For example, different physical resources or different preamble sequence can indicate different ranges of path loss.

According to another approach, the number of PRACH repetitions can for example be signaled from the UE to eNB implicitly through the UE's choice of PRACH time/frequency/sequence resource. The mapping between number of repetitions and resource could be given by the broadcasted PRACH configuration.

According to a further approach, PRACH may be used such that it can inform eNB the amount of coverage enhancement a low cost MTC UE needs. For example a pre-defined mapping can be used between PRACH resource and the amount of necessary coverage enhancements.

According to an additional approach, the system or eNB can pre-set several path loss ranges, with each path loss range related to an amount of coverage enhancement and a specific resource for preamble transmission. When eNB successfully detects the preamble transmitted by the UE on a specific resource, it can acquire the amount of coverage improvement.

Also, a very limited information on path loss can be indicated towards the network if the RRC parameter messagePowerOffsetGroupB is configured.

SUMMARY

According to a first embodiment, a method can include determining an amount of coverage shortfall of a device. The method can also include transmitting an indication of the amount of coverage shortfall.

In a variant, the amount can be a coarse amount.

In a variant, the transmitting can be contingent on a path loss of the device exceeding a first threshold path loss.

In a variant, the transmitting can be further contingent on the path loss of the device not exceeding a second threshold path loss.

In a variant, the amount can be indicated by an mPRACH.

In a variant, the transmitting can include transmitting the mPRACH overlapping a PRACH.

In a variant, the transmitting can be contingent on mPRACH being turned on by a base station.

In a variant, a period of the mPRACH can be at least double a period of the PRACH.

In a variant, the transmitting the indication can include selecting a preamble format based on a coverage shortfall.

In a variant, the determining the coverage shortfall can include comparing a path loss to a nominal path loss provided by a base station.

In a variant, the method can further include subsequently sending a fine amount of coverage shortfall in radio resource control signaling.

According to a second embodiment, a method can include preparing a threshold value associated with mPRACH. The method can also include broadcasting the threshold value.

In a variant, the method can be performed by a base station.

In a variant, the method can further including turning on the mPRACH at a first time and turning off the mPRACH at a second time.

In a variant, the threshold value can be a minimum path loss to qualify to use mPRACH.

In a variant, the method can further include broadcasting a second threshold value.

In a variant, the second threshold value can be a maximum path loss to qualify to use mPRACH.

In a variant, the method can include determining at least one of a PDCCH aggregation level or repetition factor based on a preamble selection in the mPRACH.

In a variant, the method can include providing a nominal path loss value.

According to third and fourth embodiments, respectively, an apparatus can include at least one processor and at least one memory including computer program code. The at least one memory and the computer program code can be configured to, with the at least one processor, cause the apparatus at least to perform a respective method according to the first and second embodiments, in all their variants.

According to fifth and sixth embodiments, respectively, an apparatus can include means for performing a respective method according to the first and second embodiments, in all their variants.

According to seventh and eighth embodiments, respectively, a non-transitory computer readable medium can be encoded with instructions that, when executed in hardware, perform a process. The process can be a respective method according to the first and second embodiments, in all their variants.

According to ninth and tenth embodiments, respectively, a computer program product can encode instructions for performing a process. The process can be a respective method according to the first and second embodiments, in all their variants.

According to eleventh and twelfth embodiments, respectively, a system can include the apparatuses of the third and fourth embodiments or the apparatus of the fifth and sixth embodiments.

BRIEF DESCRIPTION OF THE DRAWINGS

For proper understanding of the invention, reference should be made to the accompanying drawings, wherein:

FIG. 2 illustrates an example of mPRACH and PRACH allocation.

DETAILED DESCRIPTION

Figure 1:
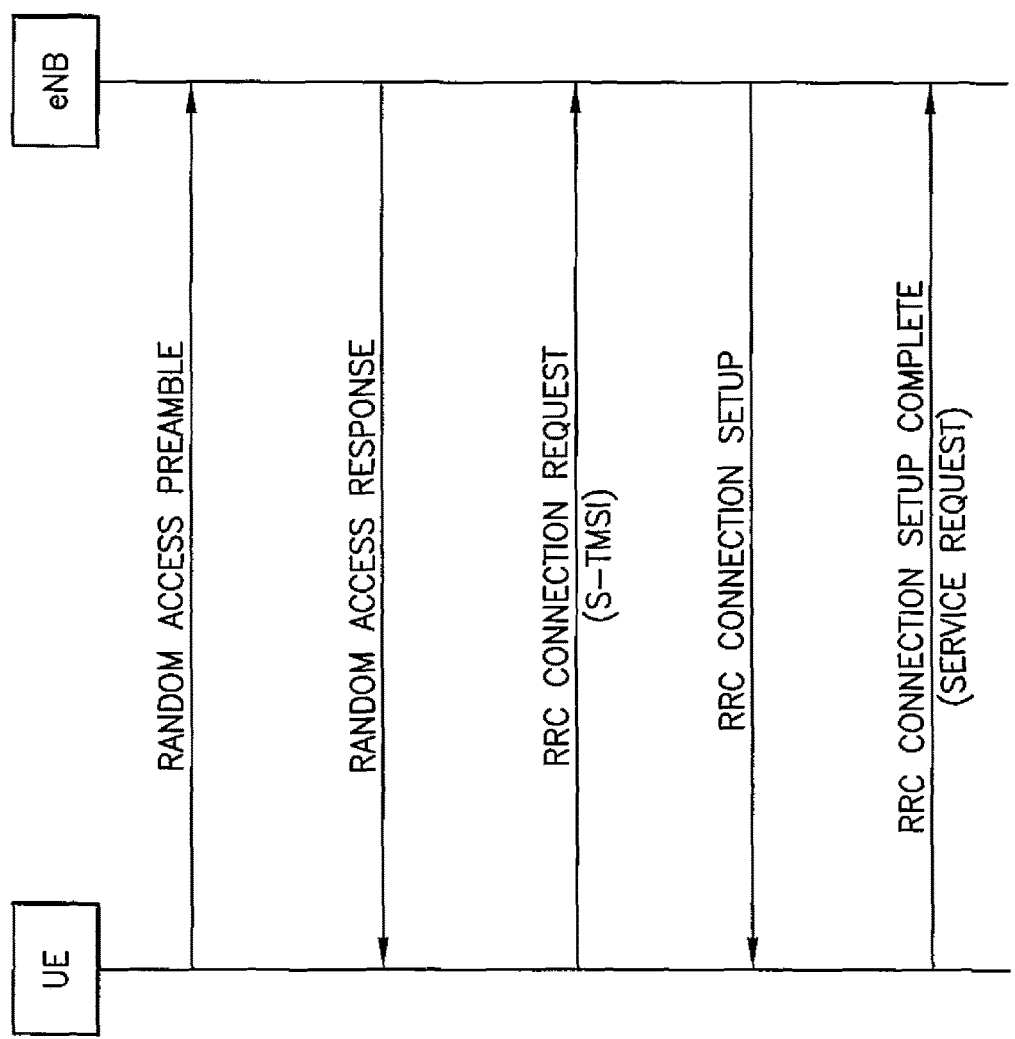
FIG. 1 illustrates an RRC connection setup message sequence.

Certain embodiments provide a mechanism so that several coverage improvement levels can be supported, for example 5 dB, 10 dB, and 15 dB. UEs can then be configured to use the appropriate amount of coverage improvement, for example repetition factor or transmission time interval (III) bundling size, depending on the UE's coverage shortfall amount.

The term "coverage shortfall" can refer to a variety of issues, such as failure to meet a coverage threshold, lack of resources, or lack of sufficient power to transmit in the whole cell. In certain embodiments, the term "coverage shortfall" refers specifically to an amount of additional signal strength desired, or needed, by a UE from the evolved Node B (eNB). For example, as will be discussed below, a UE that uses the machine type communication PRACH can calculate its estimated coverage shortfall as the difference of a measured downlink (DL) path loss and a threshold, dl-PathlossmPRACH.

Certain embodiments, for example, provide two PRACHs, a PRACH that can be viewed as a normal PRACH and a machine type communication (MTC) PRACH (mPRACH), which may be used for extended coverage.

In certain embodiments, mPRACH can be used for coverage-limited UEs with new PRACH format(s). The mPRACH can have a much longer period than PRACH, in order to reduce overhead. The period of mPRACH can be tied to a number of coverage limited UEs and other factors.

The mPRACH can overlap PRACH. For example, the mPRACH may use a same frequency resource as PRACH.

The mPRACH can be configurable by the eNB. For example, the mPRACH can be turned ON or OFF by the eNB.

The eNB can broadcast a threshold dl-PathlossmPRACH associated with mPRACH. The UEs with path loss higher than this threshold can use mPRACH for access. The eNB can also broadcast a second threshold dl-PathlossMaxmPRACH, where UEs with path loss higher than this value are not allowed to connect to the system. One or more PRACH formats can be supported within mPRACH.

The UE can communicate coarse amount of coverage shortfall using mPRACH. The coverage shortfall can be, for example, determined based on dl-PathlossExtendedPRACH.

The PDCCH aggregation level or repetition factor may be implicitly determined from the mPRACH preamble selection. For example, the UEs that use mPRACH can have supported control channel element (CCE) aggregation levels of 16 or 32, or repetition factor of 2 or 4.

In an RRC connection request message, the UE can send either a refined estimate, for example an additional estimate, or a more complete estimate of coverage shortfall amount, for example using dl-CoverageExtensionAmount. Some unused bits in the message can be repurposed to communicate this information, or some information elements can be reinterpreted to include this information.

In certain embodiments, the eNB can configure a UE to report new dl-CoverageExtensionAmount if DL PL changes by dl-PathlossCoverageChange amount.

Thus, certain embodiments may provide a two-step method for informing the eNB of the coverage shortfall: first a coarse amount can be indicated via mPRACH and then either refined/additional or complete amount can be indicated using an RRC connection request message.

Moreover, certain embodiments may employ broadcasting of the nominal cell coverage path loss by the eNB for UEs to determine the amount of coverage shortfall.

Furthermore, certain embodiments may use various methods for UEs to communicate the coverage shortfall in the mPRACH, as well as various ways to communicate coverage shortfall in the RRC connection request message.

Structure and configuration of the mPRACH can be arranged in a variety of ways, as discussed below. In certain embodiments, physical downlink control channel (PDCCH) aggregation level or repetition factor can be implicitly tied to preamble selection in the mPRACH.

More particularly, according to certain embodiments two PRACH types are supported within the system: a so-called normal PRACH and an mPRACH for extended coverage. The mPRACH can be used for coverage-limited UEs with new PRACH format(s) and can overlap the PRACH. The mPRACH can extend over a much longer time than the PRACH, to allow for longer transmission by coverage-limited UEs. Moreover, the mPRACH can repeat less frequently. An illustration of PRACH and mPRACH allocation is shown in FIGS. 2A and 2B where the PRACH occurs every other subframe while the mPRACH occurs every eight subframes. On the other hand, the mPRACH continues for four subframes while the PRACH continues for just one subframe. In FIG. 2A, the mPRACH is assigned distinct frequency resource from the PRACH, while in FIG. 2B the mPRACH overlaps with the PRACH. In the illustrated embodiment, a subframe is one millisecond, although other lengths of subframes are permitted.

The period of the mPRACH can be configured based on many factors as described below. For example, the period of mPRACH can be based on a cell range extension amount, for example, by using a ratio of extended coverage area compared to nominal coverage area. Additionally, or alternatively, the period of mPRACH can be based on the number of coverage limited UEs expected in this cell. This number can be obtained through, for example, cell planning, past historical values, or user feedback. Additionally, or alternatively, the period of mPRACH can be based on a multiple of the PRACH periodicity based on historical PRACH usage or load. Possible values for mPRACH period may be standardized and value selection, from amongst those possible values, may be made by the eNB in an implementation specific way.

In one embodiment, eNB can broadcast a threshold dl-PathlossmPRACH associated with mPRACH. UEs with path loss higher than this can be required by the eNB to use mPRACH for access.

In another embodiment, the eNB can additionally broadcast a second threshold dl-PathlossMaxmPRACH where UEs with path loss higher than this is not allowed to connect to the system. This can be used, for example, to prevent high-path loss UEs that are able to read the system information from trying to connect to the cell. It can also be used for load balancing when the system is too heavily loaded.

The parameter can be configured based on many factors. For example, the parameter can be based on a maximum supportable coverage improvement, for example a maximum repetition factor and/or power boosting. The parameter can also or additionally be based on system load, for example no coverage improvement support beyond a certain load. The parameter can further be based on a maximum amount of resource that can be reserved for MTC or for coverage improvement.

The UE using the mPRACH may not have to undergo a random access power control procedure, as it may always be transmitting at the maximum power. A UE that uses the mPRACH can calculate its estimated coverage shortfall as the difference of the measured DL path loss and dl-PathlossmPRACH. Subsequently, the UE can provide a coarse or quantized estimate of this value up to the eNB using one of several methods.

Figure 3:
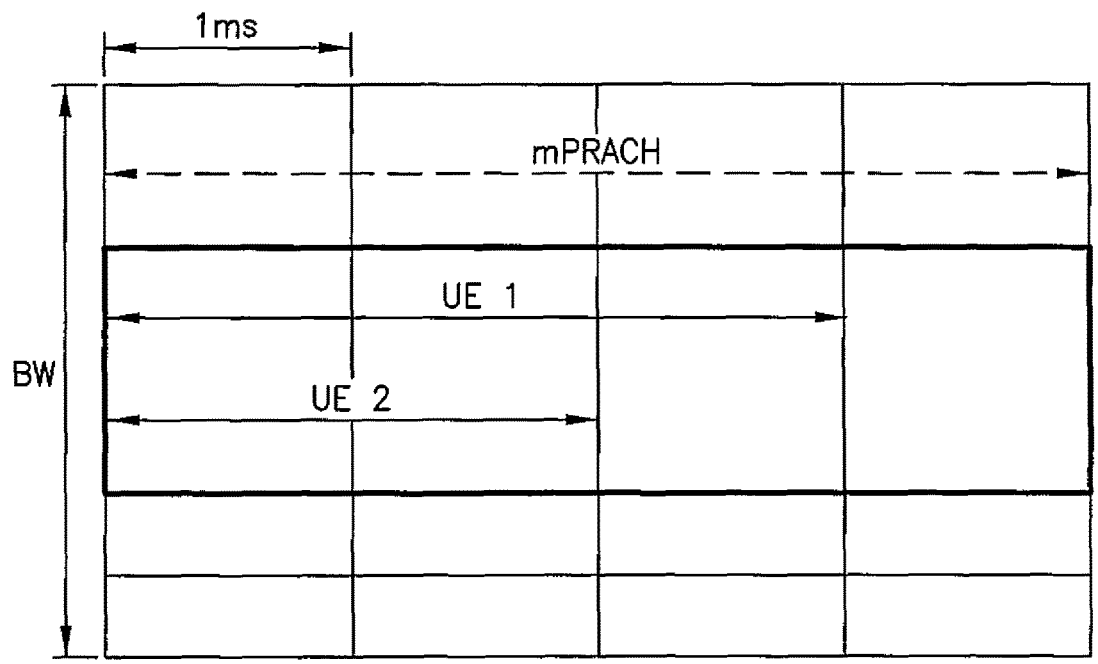
FIG. 3 illustrates an example of different repetition factors on mPRACH.

In one embodiment, the UE can use a different amount of repetition factors or transmission times as shown in FIG. 3. Coverage shortfall can be given by how long the UE transmits. For instance, several preamble formats with fixed repetition factors can be predefined (for example, 4, 8, 16, 32, and 64) and selected by the UE based on its coverage shortfall.

Figure 4:
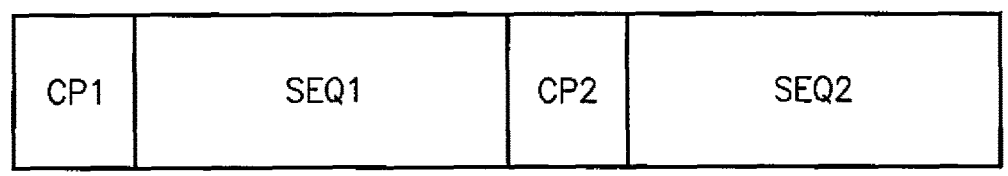
FIG. 4 illustrates path loss indicated as a phase difference between two segments.

In one embodiment, the PRACH preamble can be made up of two segments as shown in FIG. 4. Each segment can have its own cyclic prefix and each segment can use the same root sequence and preamble index. The coverage shortfall can be indicated using the phase difference between two segment sequences of a PRACH preamble to indicate the path loss. For example, the phase difference can be expressed as (x−min)/(max−min)*pi, limited to pi to avoid phase ambiguity. The terms max and min can be the maximum path loss and minimum path loss values broadcast by the eNB in the system information block (SIB) message. The term x can be the measured path loss at UE. In other words, the phase of [CP2 SEQ2] can be rotated with respect to [CP1 SEQ1]. In this way, the path loss as observed by UE can be fed back in an analog fashion. There can be further optimizations, such as for example, a nonlinear/piece-wise mapping scheme from path loss to the phase difference can be used so the path loss range(s) of interest to the network can get expanded range in the phase difference, and the nonlinear mapping or piece-wise linear mapping can be used so that some path loss range is given more detailed representation in the phase domain. For example, [−150 dBm and −100 dBm] can be mapped to [0.75]*pi, while [−100 dBm and −80 dBm] can be mapped to [0.75 to 1]*pi).

As for the corresponding PRACH receiver design, on the eNB side, two segments can be power-combined to detect the preamble index. The phase difference between two segments can be estimated at each preamble index.

In one embodiment, the coverage shortfall can be indicated by preamble or channel selection. In another embodiment, the coverage shortfall can be indicated by modulation (for example, quadrature phase shift keying (QPSK)) on top of preamble to inform eNB of coverage enhancement amount (for example, 5, 10, or 15 dB), or via spreading code. In a further embodiment, the eNB can use different detection threshold at the eNB to distinguish different amount of coverage enhancement (for example, T1, T2, T3, or T4). This can be used to fine-tune the amount of coverage enhancement where UEs transmit with the same power and the same repetition factor. This is possibly a complementary technique to other approaches, and can be combined with them.

Based on successfully detecting the preamble on the mPRACH, the eNB can have some knowledge of the amount of coverage shortfall associated with this UE. At this stage, however, only a coarse estimate may be needed for the eNB to select the appropriate MCS and repetition factor for the random access response message. The MCS and repetition factor may be communicated using the DCI on the PDCCH. However, the PDCCH itself may require a certain number of repetitions. Based on the preamble selection for the mPRACH, the UE may be able to implicitly determine the PDCCH repetition factor. For example, UEs that use mPRACH can have supported CCE aggregation levels of 16 or 32. Alternately, it may be configured for CCE aggregation level of 8 and repetition factor of 2 or 4.

In an RRC connection request message, the UE can send an additional or complete estimate of coverage shortfall amount to the eNB. This step may be made optional if, for example, the mPRACH-based procedure can provide sufficient information, such as, for example, through a flag on the system information broadcast. Alternatively, if random access capacity is a concern, the eNB may disable preamble selection on the mPRACH and rely solely on this estimate from the RRC connection request message.

In another embodiment, the information from the RRC connection request message can be used to combine with information from the preamble to arrive at more complete information. For example, a coarse estimate can be obtained via the mPRACH. Additional information can be sent in the RRC connection request message to get at a more refined shortfall level. For example, the complete information may be 3 bits obtained by combining 1 bit from PRACH with 2 bits from the RRC connection request message.

In another embodiment, information elements, spare bits, or random values in the RRC connection request message can be reinterpreted to communicate the amount of coverage shortfall. For example, some values of the Establishment-Cause information element can be reinterpreted to communicate additional information about the amount of coverage shortfall.

After RRC connection has been established, the UE may retain this information for an extended amount of time, for example in Small Data and Device Triggering Enhancements (SDDTE), a method for keeping UE in connected mode to reduce overhead may be employed. The eNB can configure UE to report the coverage shortfall if its DL PL changes by dl-PathlossCoverageChange amount, which may be equivalent to coverage shortfall changing by the same amount.

Figure 5:
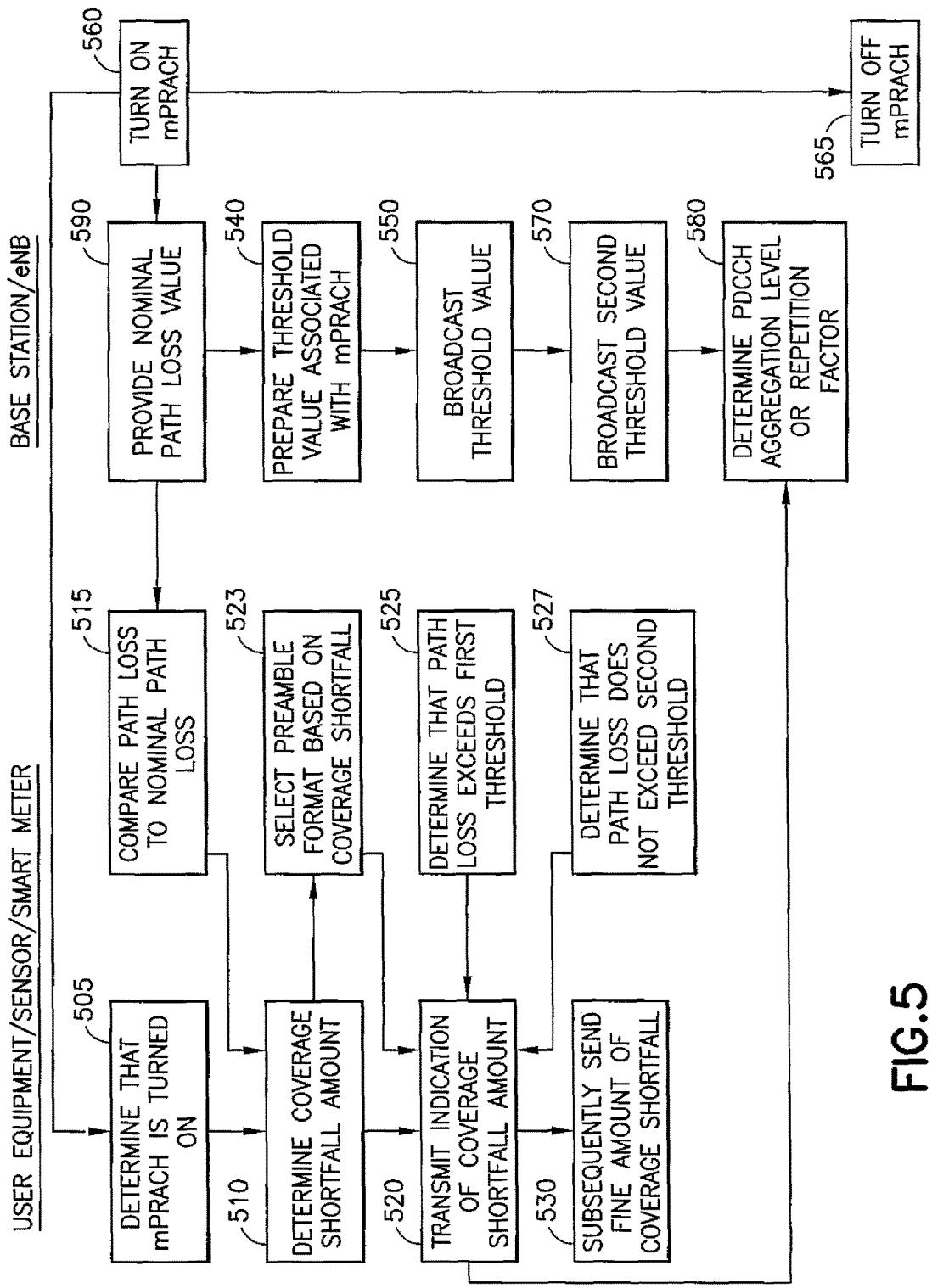
FIG. 5 illustrates a method according to certain embodiments.

FIG. 5 illustrates a method according to certain embodiments. As shown in FIG. 5, a method can include, at 510, determining an amount of coverage shortfall of a device. The can also include, at 520, transmitting an indication of the amount of coverage shortfall. The amount coverage shortfall can be indicated by an mPRACH.

The amount can be a coarse amount. For example, the coarse amount can be amount represented by one or two bits.

The transmitting can be contingent on a path loss of the device exceeding a first threshold path loss. Thus the method can include, at 525, determining that the path loss exceeds the first threshold. Moreover, the transmitting can be further contingent on the path loss of the device not exceeding a second threshold path loss. Thus the method can include, at 527, determining that the path loss does not exceed the second threshold.

The transmitting the mPRACH can include transmitting the mPRACH overlapping a PRACH, as illustrated in FIG. 2B and discussed above.

The transmitting can be contingent on mPRACH being turned on by a base station. Thus, the method can include, as shown in FIG. 5 at 505, determining that mPRACH has been turned on.

A period of the mPRACH can be at least double a period of the PRACH, as illustrated in FIGS. 2A and 2B.

The transmitting the indication can include, at 523, selecting a preamble format based on a coverage shortfall.

The determining the coverage shortfall can include, at 515, comparing a path loss to a nominal path loss provided by a base station.

The method can further include, at 530, subsequently sending a fine amount of coverage shortfall in radio resource control signaling.

The above steps can be performed by, for example, any terminal device, such as a user equipment broadly including devices such as sensors and smart meters in addition to devices like smart phones and personal digital assistants. The following steps can be performed by a base station, such as an evolved node B (eNB).

Thus, as shown in FIG. 5, the method can include, at 540, preparing a threshold value associated with mPRACH. The method can also include, at 550, broadcasting the threshold value.

The method can further include, at 560, turning on the mPRACH at a first time and, at 565, turning off the mPRACH at a second time.

The threshold value can be a minimum path loss to qualify to use mPRACH. The method can further include, at 570, broadcasting a second threshold value. The second threshold value can be a maximum path loss to qualify to use mPRACH.

The method can include, at 580, determining at least one of a PDCCH aggregation level or repetition factor based on a preamble selection in the mPRACH.

In a variant, the method can also include, at 590, providing a nominal path loss value to the user equipment or similar device.

Figure 6:
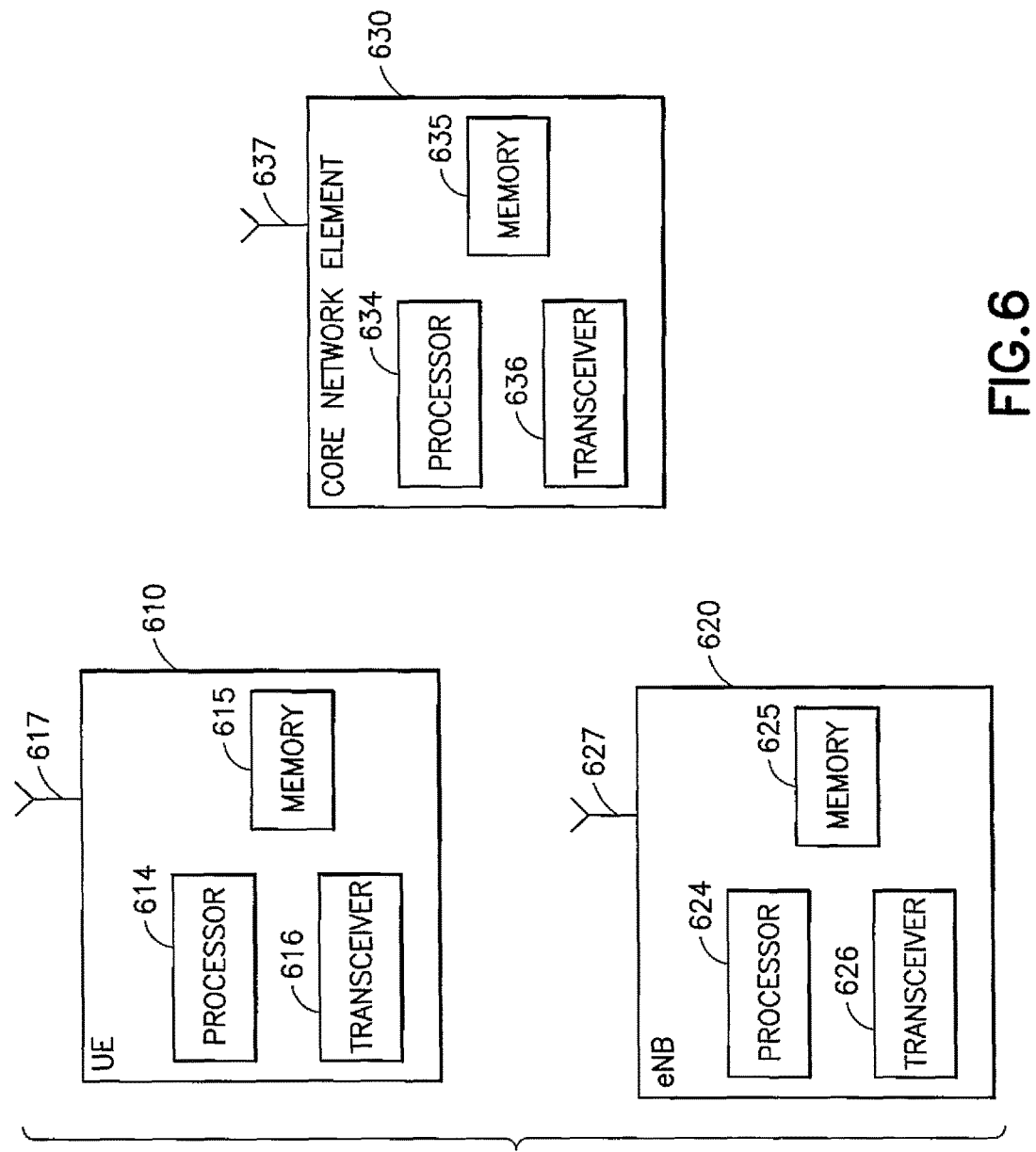
FIG. 6 illustrates a system according to certain embodiments.

FIG. 6 illustrates a system according to certain embodiments of the invention. In one embodiment, a system may include multiple devices, such as, for example, at least one UE 610, at least one eNB 620 or other base station or access point, and at least one core network element 630. In certain systems, only UE 610 and eNB 620 may be present, and in other systems UE 610, eNB 620, and a plurality of other user equipment may be present. Other configurations are also possible.

Each of these devices may include at least one processor, respectively indicated as 614, 624, and 634. At least one memory can be provided in each device, and indicated as 615, 625, and 635, respectively. The memory may include computer program instructions or computer code contained therein. The processors 614, 624, and 634 and memories 615, 625, and 635, or a subset thereof, can be configured to provide means corresponding to the various blocks of FIG. 5.

As shown in FIG. 6, transceivers 616, 626, and 636 can be provided, and each device may also include an antenna, respectively illustrated as 617, 627, and 637. Other configurations of these devices, for example, may be provided. For example, core network element 630 may be configured for wired communication, rather than wireless communication, and in such a case antenna 637 would illustrate any form of communication hardware, without requiring a conventional antenna.

Transceivers 616, 626, and 636 can each, independently, be a transmitter, a receiver, or both a transmitter and a receiver, or a unit or device that is configured both for transmission and reception.

Processors 614, 624, and 634 can be embodied by any computational or data processing device, such as a central processing unit (CPU), application specific integrated circuit (ASIC), or comparable device. The processors can be implemented as a single controller, or a plurality of controllers or processors.

Memories 615, 625, and 635 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as UE 610, eNB 620, and core network element 630, to perform any of the processes described above (see, for example, FIG. 5). Therefore, in certain embodiments, a non-transitory computer-readable medium can be encoded with computer instructions that, when executed in hardware, perform a process such as one of the processes described herein. Alternatively, certain embodiments of the invention can be performed entirely in hardware.

Furthermore, although FIG. 6 illustrates a system including a UE, eNB, and core network element, embodiments of the invention may be applicable to other configurations, and configurations involving additional elements. For example, not shown, additional UEs may be present.

Various embodiments may have various benefits or advantages. For example, certain embodiments provide for broadcasting of the nominal cell coverage path loss by the eNB, which may allow for accurate determination of the coverage shortfall using information already available at the UE during access attempts, for example, DL path loss.

Moreover, coarse estimate (for example, 1 bit) of coverage shortfall sent on the mPRACH can allow higher capacity to be supported on the mPRACH and for appropriate transmission of random access response.

Additional or complete estimate sent on the RRC connection setup message can allow coverage improvement to be tailored for individual UE, saving resources by using the appropriate level of coverage improvement. Also such an approach may correct any error from mPRACH estimate.

Overhead saving may also be achieved by allowing mPRACH to overlap with PRACH, and by allowing eNB to also control the number of coverage-limited UEs attaching to the cell as well as the allowable coverage improvement.

Certain embodiments may be applicable to systems relying on LTE Rel-12 specifications. Other embodiments, however, can be implementation-specific and can be done exclusively at the eNB.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

Glossary

CCE Control Channel Element
CRC Cyclic Redundancy Check
DL Downlink
HARQ Hybrid Automatic Repeat Request
MIB Master Information Block
MTC Machine Type Communications
PHICH Physical HARQ Indicator Channel
PL Path Loss
PRACH Physical Random Access Channel
PUSCH Physical Uplink Shared Channel
QPSK Quadrature Phase Shift Keying
RRC Radio Resource Control
SIB System Information Block
SINR Signal to Interference plus Noise Ratio
SDDTE Small Data and Device Triggering Enhancements
TTI Transmission Time Interval
UE User Equipment
UL Uplink

We claim:

1. A method, comprising:
   in a base station,
   transmitting to a mobile device, information indicating support of a plurality of coverage enhancement levels for the mobile device, wherein a coverage enhancement level provides signal strength information and each coverage enhancement level corresponds to a different physical random access channel for the mobile device; and
   receiving from the mobile device, a preamble signal using a physical random access channel corresponding to a coverage enhancement level selected, by the mobile device, from the plurality of coverage enhancement levels,
   wherein the physical random access channel corresponding to the selected coverage enhancement level is an extended physical random access channel overlapping a physical random access channel.

2. The method of claim 1, wherein the selected coverage enhancement level is based on measurements at the mobile device for downlink signal strength of the base station.

3. The method of claim 1, wherein an amount of coverage enhancement required by the mobile device from the base station is determined related to the selected coverage enhancement level.

4. The method of claim 3, comprising receiving from the mobile device, an indication of the amount of coverage enhancement required by the mobile device.

5. The method of claim 1, wherein the selected coverage enhancement level is contingent on a path loss of the mobile device.

6. The method of claim 1, wherein a period of the extended physical random access channel is different from a period of the physical random access channel.

7. The method of claim 3, wherein a preamble format is selected based on the amount of coverage enhancement required by the mobile device.

8. The method of claim 3, wherein the amount of coverage enhancement required by the mobile device is determined by comparing the downlink signal strength measurement of the base station with signal strength information associated with one or more of the plurality of coverage enhancement levels provided by the base station.

9. The method of claim 4, comprising transmitting a random access response message having at least one of a physical downlink control channel aggregation level or a repetition factor based on the indication of the amount of coverage enhancement.

10. An apparatus, comprising:
    at least one processor; and
    at least one memory including computer program code,
    wherein the at least one memory and the computer program code are configured to, with the at least one processor, cause the apparatus at least to
    transmit to a mobile device, information indicating support of a plurality of coverage enhancement levels for the mobile device, wherein a coverage enhancement level provides signal strength information and each coverage enhancement level corresponds to a different physical random access channel for the mobile device; and receive from the mobile device, a preamble signal using a physical random access channel corresponding to a coverage enhancement level selected by the mobile device, from the plurality of coverage enhancement levels, wherein the physical random access channel corresponding to the selected coverage enhancement level is an extended physical random access channel overlapping a physical random access channel.

11. The apparatus of claim 10, wherein the selected coverage enhancement level is based on measurements at the mobile device for downlink signal strength of the apparatus.

12. The apparatus of claim 10, wherein an amount of coverage enhancement required by the mobile device from the apparatus is determined related to the selected coverage enhancement level.

13. The apparatus of claim 12, wherein the at least one memory and the computer program code are configured to, with the at least one processor, cause the apparatus at least to receive from the mobile device, an indication of the amount of coverage enhancement required by the mobile device.

14. The apparatus of claim 10, wherein the selected coverage enhancement level is contingent on a path loss of the mobile device.

15. The apparatus of claim 10, wherein a period of the extended physical random access channel is different from a period of the physical random access channel.

16. The apparatus of claim 12, wherein a preamble format is selected based on the amount of coverage enhancement required by the mobile device.

17. The apparatus of claim 12, wherein the amount of coverage enhancement required by the mobile device is determined by comparing the downlink signal strength measurement of the apparatus with signal strength information associated with one or more of the plurality of coverage enhancement levels provided by the apparatus.

18. The apparatus of claim 13, wherein the at least one memory and the computer program code are configured to, with the at least one processor, cause the apparatus at least to transmit a random access response message having at least one of a physical downlink control channel aggregation level or a repetition factor based on the indication of the amount of coverage enhancement.

19. A non-transitory computer readable medium, encoded with instructions that, when executed in hardware, cause the hardware to perform a process, the process comprising:

transmitting to a mobile device, information indicating support of a plurality of coverage enhancement levels for the mobile device, wherein a coverage enhancement level provides signal strength information and each coverage enhancement level corresponds to a different physical random access channel for the mobile device; and receiving from the mobile device, a preamble signal using a physical random access channel corresponding to a coverage enhancement level selected by the mobile device, from the plurality of coverage enhancement levels, wherein the physical random access channel corresponding to the selected coverage enhancement level is an extended physical random access channel overlapping a physical random access channel.

20. The non-transitory computer readable medium of claim 19, wherein an amount of coverage enhancement required by the mobile device is determined related to the selected coverage enhancement level.

* * * * *